Aug. 18, 1953  K. A. S. KARLSTRÖM  2,649,286
VIBRATOR
Filed June 18, 1951
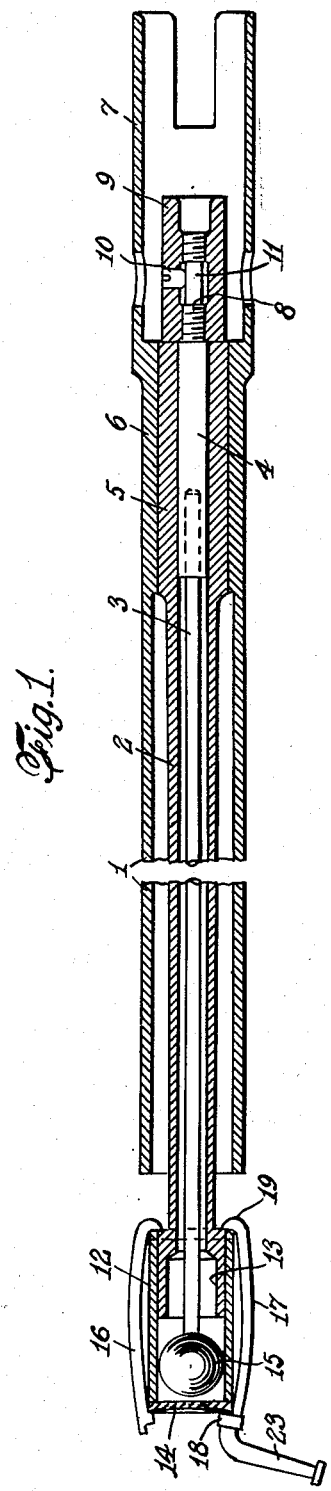
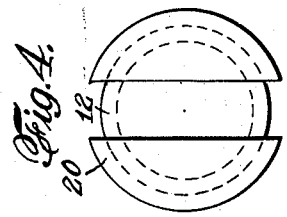
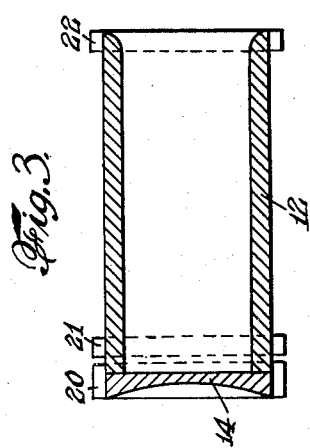
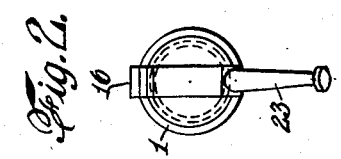
INVENTOR.
KARL AXEL SAM KARLSTROM
BY
ATTORNEY.

Patented Aug. 18, 1953

2,649,286

UNITED STATES PATENT OFFICE 2,649,286

VIBRATOR

Karl Axel Sam Karlström, Gavle, Sweden

Application June 18, 1951, Serial No. 232,107
In Sweden June 22, 1950

4 Claims. (Cl. 259—1)

The present invention refers to such mechanical vibrators, wherein the vibrations are generated by the rolling of a rolling body on the inside of a hollow impulse member arranged on the outer end of a resilient tubular arm enclosing a spindle to which said rolling body is secured. Hitherto, vibrators of said type have been used substantially only for vibrating of concrete and the like. The present invention has for its object to make vibrators of this type serviceable for works occurring in the dental technology, for instance for the vibration of amalgam. The invention is substantially distinguished by the feature that the resilient arm carrying the impulse member is secured, together with the bearings of the driving spindle, in a protecting tube enclosing the arm and serving as a handle. Through the resilient arrangement of the impulse member relatively to the handle a considerable advantage is gained with respect to the manipulation of the vibrator, inasmuch as the handle will be relieved of the vibrations to a considerable extent, while the oscillatory movement is permitted at the same time to develop freely, without being suppressed by the hand and the handle during the work. Preferably, the driving spindle is also made resilient according to the invention, whereby the construction is simplified and permits the bearings of the spindle to be rigidly arranged in the holder.

The invention is illustrated in the accompanying drawing, which shows a form of embodiment in accordance with the invention. Fig. 1 is a longitudinal section through the vibrator, and Fig. 2 is an endwise view of the same. Figs. 3 and 4 show the impulse member to a larger scale in longitudinal section and in an endwise view, respectively.

The vibrator according to the embodiment shown in Figs. 1-4 comprises two tubes 1 and 2 arranged concentrically one within the other, and a driving spindle 3 centrally arranged within the tube 2, said spindle being soldered fast in a bore in a stud 4, by means of which the spindle is mounted in the rear end 5 of the tube 2 formed as a bearing. The tubes 1 and 2 are rigidly united with each other by a close fit between the bearing 5 and the corresponding rear portion 6 of the tube 1. The outer tube is provided with an extension 7 adapted to receive a coupling, by means of which the driving spindle 3, i. e. the stud 4 thereof is connected to an outer driving shaft not shown in the drawing. Fig. 1 shows a member 9 of a clutch coupling secured to a rear extension 8 of the stud 4, said coupling being threaded onto the member 8 and locked thereto by means of a set screw 10 adapted to be set against a bevelled portion 11 of the stud extension 8. The outer tube 1 surrounds the tube 2 approximately all over the length thereof. Attached to the end of the tube 2 projecting from the tube 1 is an impulse member in the form of a cylinder 12, which is pressed fast onto the larger end 13 of the tube 2 and closed at its outer end by means of a shield 14.

Arranged on the outer end of the resilient spindle 3 is a spherical ball 15, the diameter of which is somewhat smaller than the internal diameter of the cylinder 12. The shield 14 is retained on the cylinder 12 by means of two resilient arcuate clamps 16, 17 extending in the longitudinal direction of the cylinder and adapted by means of two abutments or bosses 18, 19 to grasp about the edges of the cylinder and the shield, in a manner such that the clamps will be retained securely in their places through their own resiliency. The clamps are recessed into axial grooves in flanges 20, 21, 22 on the shield 14 and the cylinder 12 respectively. The clamps are secured by being pressed against the cylinder wall so as to become straightened out sufficiently to permit the abutments 18, 19 to be brought into their position of engagement. They are removed by being similarly pressed at simultaneous raising of the clamp at one end thereof. At the same time said clamps serve as holders for the vibrating tools. Figs. 1 and 2 show such a tool 23 arranged on the outer end of the clamp 17 and intended for the vibrating of amalgam. The other clamp may also be provided with a vibrating tool in a similar manner, this latter tool being preferably of a different kind.

The tube 2 carrying the impulse member tapers toward the end thereof with respect both to the external diameter and to the wall thickness. Hereby the requisite resiliency is imparted to the tube, said resiliency permitting of being adapted to the various uses by a suitable selection of the width and the wall thickness of the tube. The driving spindle 3 may consist of steel wire.

After the spindle 3 has been brought into rotation, the ball 15 is moved into frictional engagement with the inside of the cylinder by a light tap on the apparatus in the transverse direction thereof. The contact with the cylinder is then maintained through the influence of the centrifugal force. The ball will thus revolve about the spindle 3, and will also perform a revolving movement about the longitudinal axis of the cylinder 12 in a manner similar to that of the planet wheel in a planet gearing, wherein the cylinder 12 corresponds to the sun wheel and forms the running track of the ball. The number of cycles F for the oscillatory movement caused by the rolling motion is defined by the rotational speed of the spindle 3 and the ratio between the diameter of the ball and the internal diameter of the cylinder according to the formula $$F=\frac{n \cdot d}{D-d}$$

where $n$ is the number of revolutions of the spindle 3, D the internal diameter of the cylinder, and $d$ the diameter of the ball. If the ratio between D and $d$ is chosen greater than ½ a step-up change of the oscillatory movement will be obtained, so that the number of cycles of the ball as caused by the rolling motion thereof becomes greater than the number of revolutions of the spindle 3. In the use of the vibrator for dental purposes, the number of revolutions of the spindle 3 may be 50 r./sec. and the number of cycles of the ball between 2000 and 3000 per second, for example. On account of the resiliency of the tube 2 an oscillatory rotary movement of a periodicity the same as that of the revolving movement of the ball will be imparted to the impulse member 12, the tool being thus caused to vibrate at the same frequency in the longitudinal direction of the tool. The oscillatory movement in the transverse direction may be reduced by imparting an elliptic cross sectional shape to the cylinder 12, the longitudinal axis of the ellipse then lying in a plane extending through the point of the tool and the longitudinal axis of the cylinder. During the rotary movement the tube 2 is caused to swing within the outer tube 1 serving as a handle in the manipulation of the apparatus and as a guard against contact with the oscillating tube 2.

Through the arrangement of the various parts of the apparatus as described a very condensed construction of small outer dimensions is obtained, which may even become smaller than the dimensions of the ordinary hand-piece pertaining to a dental drilling machine. Hereby the dimensions of the apparatus become sufficiently small to permit the apparatus to be used also for work within the mouth. A further advantage consists in that the oscillatory movement will not be suppressed by the handle or by the apparatus being held in the hand. Besides, the impulse member will have sufficient oscillatory energy imparted to the same so as not to be damped appreciably by the pressure of the tool against the object to be vibrated. Consequently, the apparatus is also well suited for the vibrating of moulds. The tools may be easily exchanged, and with the use of two tools arranged on the same impulse member the advantage is obtained that an exchange of tools need not be effected so frequently, and that it will be possible rapidly to make a change from working with one of the tools to working with the other. An exchange of tools is effected by a simple manipulation. By the tools being secured by means of clamps in the manner illustrated an effective retaining of the tool is obtained, so that it will not be shaken loose through the vibrations.

The amplitude of the oscillations of the impulse member and of the tools is dependent on the centrifugal force acting upon the ball and on the resiliency of the tube 2, so that the amplitude will be greater with less rigidity and a greater length of the tube. The oscillatory frequency depends on the rotational speed of the spindle 3 and then, above all, on the ratio between the diameters of the ball and the cylinder. This ratio may be varied by making the running track of the ball on the inside of the cylinder 12 conical and by making the ball adjustable in the axial direction, for instance by means of the thread connection between the coupling member 9 and the stud extension 8.

The tool 23 may be formed at the outer end thereof into a plate, as shown in the drawing, or into a ball, spatula, file, cutter, impact bit, grinding tool, chisel or knife, or it may be given any other shape depending on its uses; it should be understood that the invention is not limited to dental uses.

I claim:

1. A vibrator comprising a resilient tubular arm, a hollow cylindrical impulse member secured to the forward end of said arm, a vibrating tool, a resilient arcuately curved clamp extending longitudinally of said impulse member and having abutments engaging the ends of the impulse member to retain the tool in place on the impulse member by the resiliency of the clamp, a spindle extending through the resilient tubular arm and having a forward end portion projecting into the hollow impulse member, a rotating body secured to the forward end of the spindle and adapted to roll on the inner surface of the hollow impulse member as the spindle rotates to impart vibratory movement to the impulse member in a direction substantially perpendicular to said arm, means for connecting the spindle to a motor, and a handle comprising a protecting tube surrounding the resilient tubular arm substantially throughout the length of said arm, the rear end of said arm being secured to said tube and the forward portion of said arm being smaller than the inside of said tube whereby the forward portion of the arm is free to vibrate within the tube.

2. A vibrator comprising a tubular arm, a resilient tubular arm having its rearward end portion secured in said handle and projecting forwardly beyond the end of the handle, a hollow cylindrical impulse member secured to the projecting forward end of said arm, a spindle extending through the resilient tubular arm and having a forward end portion projecting into the hollow impulse member, a rotating body secured to the forward end of the spindle and adapted to roll on the inner surface of the hollow impulse member as the spindle rotates to impart vibratory movement to the impulse member in a direction substantially perpendicular to said arm, means for connecting the spindle to a motor, a resilient arcuately curved clamp extending longitudinally of the impulse member and having abutments engaging the ends of the impulse member to retain the clamp on the impulse member by the resiliency of the clamp, and a tamping tool secured to the impulse member by said clamp, said tool having an elongated shank portion projecting from the impulse member in a direction approximately perpendicular to its longitudinal axis.

3. A vibrator comprising a resilient tubular arm, a hollow cylindrical impulse member secured to the forward end of said arm, a vibrating tool, a resilient clamp extending longitudinally of said impulse member and having abutments engaging the ends of the impulse member to retain the tool in place on the impulse member by the resiliency of the clamp, a spindle extending through the resilient tubular arm and having a forward end portion projecting into the hollow impulse member, a rotating body secured to the forward end of the spindle and adapted to roll on the inner surface of the hollow impulse member as the spindle rotates to impart vibratory movement to the impulse member in a direction substantially perpendicular to said arm, means for connecting the spindle to a motor, and a handle comprising a protecting tube surrounding the resilient tubular arm substantially through the length of said arm, the rear end of said arm being secured to said tube and the forward portion of said arm having a smaller width than the inside of said tube whereby the forward portion of the arm is free to vibrate within the tube.

4. A vibrator comprising a tubular arm, a hollow cylindrical impulse member secured to the projecting forward end of said arm, a spindle extending through the tubular arm and having a forward end portion projecting into the hollow impulse member, a rotating body secured to the forward end of the spindle and adapted to roll on the inner surface of the hollow impulse member as the spindle rotates to impart vibratory movement to the impulse member in a direction substantially perpendicular to said arm, means for connecting the spindle to a motor, a resilient clamp extending longitudinally of the impulse member and having abutments engaging the ends of the impulse member to retain the clamp on the impulse member by the resiliency of the clamp, and a tamping tool secured to the impulse member by said clamp, said tool having an elongated shank portion projecting from the impulse member in a direction transverse to its longitudinal axis.

KARL AXEL SAM KARLSTRÖM.

References Cited in the file of this patent

UNITED STATES PATENTS

| Number | Name | Date |
|---|---|---|
| 1,242,824 | Lindsay | Oct. 9, 1917 |
| 1,747,555 | Pelton | Feb. 18, 1930 |
| 2,269,938 | Jackson | Jan. 13, 1942 |
| 2,276,613 | Gordon | Mar. 17, 1942 |

FOREIGN PATENTS

| Number | Country | Date |
|---|---|---|
| 70,055 | Norway | Sept. 20, 1944 |